Figure 8:
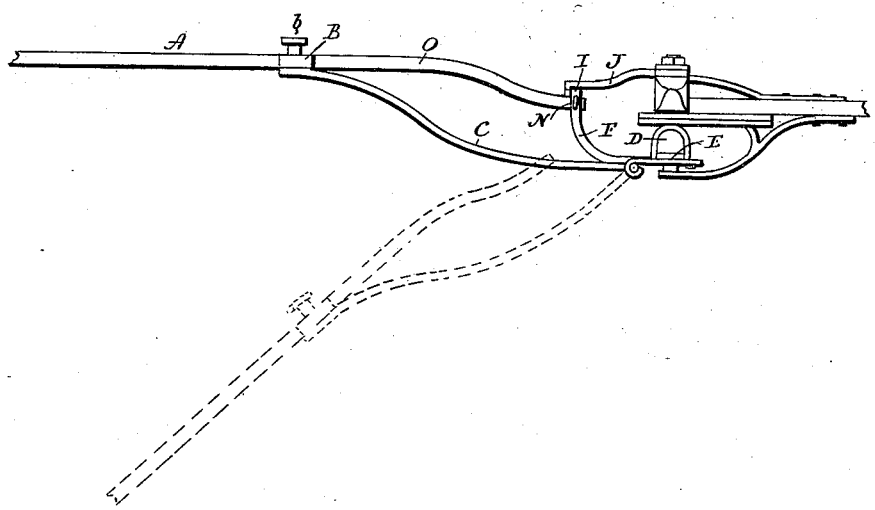

No. 607,804. Patented July 19, 1898.
W. A. MAYCOCK.
POLE OR THILL SUPPORT FOR VEHICLES.
(Application filed Dec. 27, 1897.)
(No Model.) 2 Sheets—Sheet 1.
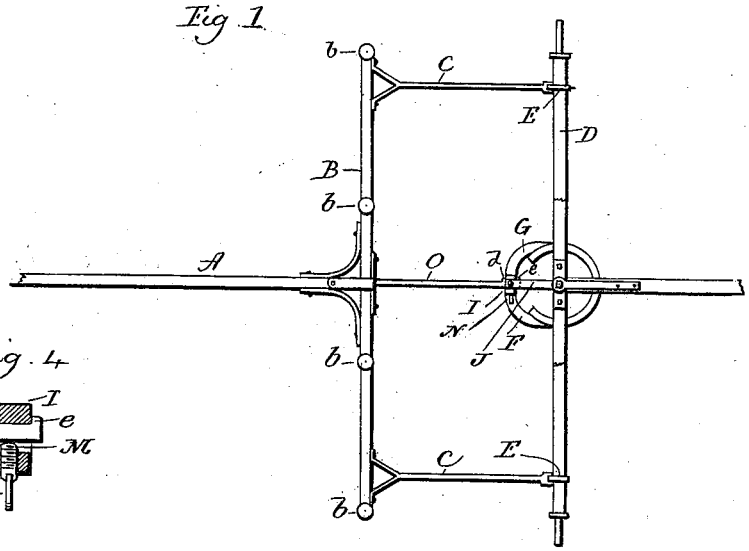
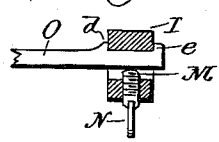
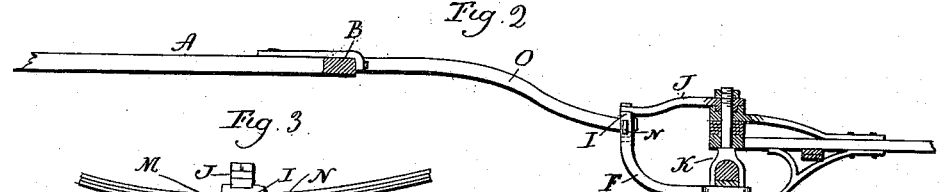
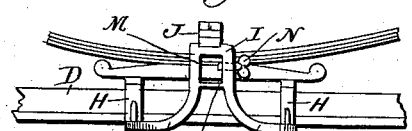
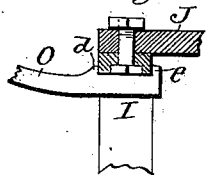
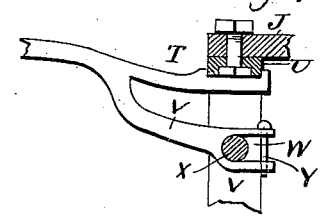
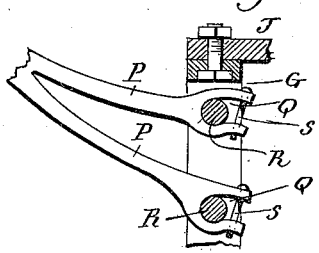

No. 607,804. Patented July 19, 1898.
W. A. MAYCOCK.
POLE OR THILL SUPPORT FOR VEHICLES.
(Application filed Dec. 27, 1897.)
(No Model.) 2 Sheets—Sheet 2.

UNITED STATES PATENT OFFICE.

WILLIAM A. MAYCOCK, OF NEW HAVEN, CONNECTICUT, ASSIGNOR OF ONE-HALF TO JOHN HARTY, OF SAME PLACE.

POLE OR THILL SUPPORT FOR VEHICLES.

SPECIFICATION forming part of Letters Patent No. 607,804, dated July 19, 1898.

Application filed December 27, 1897. Serial No. 663,490. (No model.)

*To all whom it may concern:*

Be it known that I, WILLIAM A. MAYCOCK, of New Haven, in the county of New Haven and State of Connecticut, have invented a new Improvement in Pole or Thill Supports for Carriages; and I do hereby declare the following, when taken in connection with the accompanying drawings and the letters of reference marked thereon, to be a full, clear, and exact description of the same, and which said drawings constitute part of this specification, and represent, in—

Figure 1, a top or plan view of the inner end of a carriage-pole and support therefor and its connection with the axle constructed in accordance with my invention; Fig. 2, a side view, partially in section, of the same construction enlarged; Fig. 3, a front view of the axle and yoke applied thereto; Fig. 4, a top view of the inner end of the bar, with the upper portion of the yoke in section; Figs. 5, 6, and 7, broken central sections of the yoke and side view of the inner end of the support, illustrating modifications in the construction of the support; Fig. 8, a side view of my improved support, illustrating it as disconnected to permit the pole to drop.

This invention relates to an improvement in supports for the poles or thills of carriages, and particularly to that class which are connected to the axle by couplings and which, owing to the fact that they are permitted to drop downward, are known as "drop-poles" in contradistinction to poles of coaches and other heavy vehicles in which the pole is held in a horizontal position by a socket, into which the inner end of the pole is inserted, and which are called "stiff poles."

For convenience of illustration I have shown the invention as applied to a carriage-pole; but it is apparent that it is equally applicable to carriage-thills.

The object of my present invention is to connect the center of the whiffletree-bar or trace-bar with a yoke extending forward from the axle, which connection extends downward from a horizontal line of the pole or thills, so as to support the pole or thills in a substantially horizontal position and thus convert a drop-pole to a stiff pole; and it consists in the construction as hereinafter described, and particularly recited in the claims.

The pole A (or it may be the thills) is connected with a bar B, which carries trace-posts *b* or whiffletree-bars of usual construction and which it is unnecessary to illustrate. Extending rearward from this bar B are arms C, which are connected at their inner ends with the axle D by couplings E, all of usual construction. Secured to the axle is a yoke, the sides F G of which curve forward and upward from the axle, to which they are secured on opposite sides of the center by clips H, and the upper end or top bar I of this yoke is supported by a brace J, which extends from the top of the yoke rearward into engagement with the king-bolt K of the carriage, and so that the said yoke turns with the axle. Below and parallel with the top bar I is a transverse pin or bar L, forming a rectangular opening M in the upper end of the yoke. Extending through one side of the yoke, as F, between the bars I L, is a threaded opening to receive a set-screw N, the purpose of which will hereinafter appear. From the center of the bar B a support extends downward and rearward into engagement with this yoke, and preferably this support will consist of an arm O, suitably secured to the pole or trace-bar B and bowed downward and rearward therefrom, and on one side of its rear or inner end it is provided with fingers or lugs *d e*, which form a notch in the side of the arm corresponding in width to the thickness of the side of the yoke. The end of the arm O is passed through the opening in the upper end of the yoke, so that its notch will engage one side of the yoke, with which it is locked or held by the set-screw N. Instead of forming the fingers *d e* on the side of the arm O they may be formed on its upper surface, so as to engage with the top bar I of the yoke, as shown in Fig. 5. As the engagement between the inner end of the support and the yoke is below the horizontal line of the pole or shafts, the support will not be readily disconnected.

Instead of forming the arm as described it may be bifurcated at its inner end, forming fingers P P, in which are segmental notches Q, as shown in Fig. 6, for engagement with transverse pins R R, which extend between the sides of the yoke and parallel with the upper bar thereof. These pins may be formed integral with the yoke or inserted through the sides thereof. As an additional guard a vertical pin S may be passed through the outer ends of the notched fingers P, and as indicated in Fig. 6, so as to lock those fingers with the transverse pins.

Instead of employing two transverse pins and forming the fingers with segmental slots they may be formed as shown in Fig. 7, in which the upper finger T is formed in its upper edge with a notch, as above described, for engagement with the central portion U of the yoke and the lower finger V with a transverse notch W for engagement with the lower pin or bar X. As in the previous case, a pin or key Y may be inserted through the ends of the lower member V.

While the inner end of the arm O is engaged with the yoke the pole is practically a stiff pole; but when not in use it is only necessary to loosen the thumb-screw N or remove the pins S or Y to permit the ready disengagement of the inner end of the bar O and the yoke, so that the pole may drop downward, as shown in broken lines, Fig. 8. This downward movement is possible because the connection between the pole-arms and the axle is below the point of engagement between the bar O and the yoke.

This attachment is readily applicable to any drop-pole and readily converts it to a stiff pole. While not often required for carriage-thills, it might be desired in some instances, and, if so, is equally applicable.

In view of the modifications suggested I do not wish to be understood as limiting the invention to any particular form of support.

Having fully described my invention, what I claim as new, and desire to secure by Letters Patent, is—

1. In a pole or thill support, the combination with an axle, of a trace-bar coupled therewith, a support connected with said bar and extending downward and rearward therefrom, and an upwardly-extending yoke carried by the axle and with which the inner end of the support is engaged, substantially as described.

2. In a pole or thill support, the combination with an axle, of a trace-bar coupled therewith, a support connected with the said bar and extending downward and rearward from the center thereof, and a centrally-arranged yoke extending upward and forward from the center of the axle and with which the inner end of the support is engaged.

3. In a pole or thill support, the combination with an axle, of a trace-bar coupled therewith, a support connected with the said bar and extending downward and rearward therefrom, and formed with a notch at its inner end, and an upwardly-extending yoke carried by the axle and with which the inner end of the support is engaged, substantially as described.

4. In a pole or thill support, the combination with a trace-bar, a support extending downward and rearward therefrom, and formed with a notch in one side, and a yoke extending upward and forward from the axle, and provided with transverse bars between which the inner end of the support extends for engagement with the side of the yoke, substantially as described.

5. In a pole or thill support, the combination with a trace-bar, a support extending downward and rearward therefrom and formed with a notch in one side, a yoke extending upward and forward from the axle, and provided with transverse bars between which the inner end of the support extends for engagement with one side of the yoke, and a set-screw extending through the other side of the yoke for holding the inner end of the support in position, substantially as described.

In testimony whereof I have signed this specification in the presence of two subscribing witnesses.

WILLIAM A. MAYCOCK.

Witnesses:
 FRED. C. EARLE,
 LILLIAN D. KELSEY.